April 12, 1949.  G. E. GOTT  2,466,986
VALVE FOR INFLATABLE OBJECTS
Filed May 8, 1946
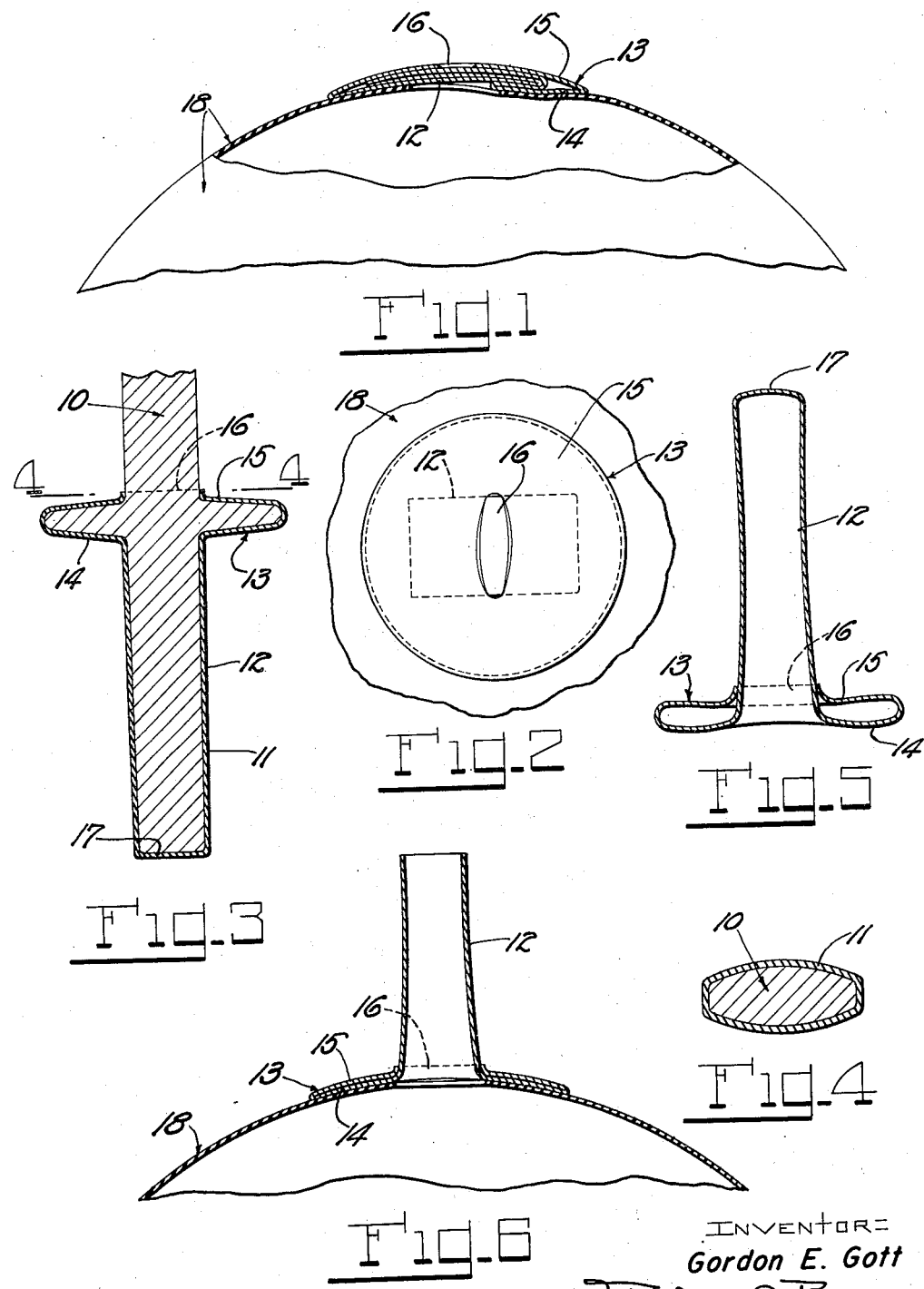
INVENTOR:
Gordon E. Gott
by Theodore C. Browne
Atty.

Patented Apr. 12, 1949

2,466,986

UNITED STATES PATENT OFFICE 2,466,986

VALVE FOR INFLATABLE OBJECTS

Gordon E. Gott, Arlington, Mass., assignor to Dewey and Almy Chemical Company, North Cambridge, Mass., a corporation of Massachusetts Application May 8, 1946, Serial No. 668,276

2 Claims. (Cl. 273—65.4)

This invention relates to a valved-inflating nozzle for playballs, decoys, swimming belts and other articles which are commonly inflated by blowing up by lung pressure.

It is an object of the invention to produce a valved-inflating nozzle which is simple to manufacture, cheap, and dependable in operation. Additionally, it is an object to produce a tuck-under valve which has no protruding part which may catch on clothing and open, which is dangerous in the case of swim bladders, or protrude from the surface and interfere with the bounce of a ball.

The valve which is the object of my invention accomplishes these purposes in a most satisfactory manner. Essentially, the valve is a tube which projects from the inner wall of a torus or hollow flange through an aperture in the opposite wall. The tube carrying wall of the torus forms the flange by which the valve is attached to the bladder or playball. After inflating the ball by blowing through the extended tube, the tube is folded and tucked back through the aperture where the outer torus wall now stressed by the inflation of the ball compresses the folded tube and holds it tightly closed.

The invention may be better understood by reference to the drawings in which

Figure 1 shows a portion of a playball and is partially in section, the sectional view showing the closed valve which maintains the ball in inflated condition;

Figure 2 is a top view of the closed valve, as illustrated in Figure 1;

Figure 3 is a sectional view of the mold upon which the valve is formed and also shows the coating of rubber which is deposited on the mold;

Figure 4 is a cross sectional view of the mold and rubber coating on the line 4—4 of Figure 3;

Figure 5 is a cross sectional view of the valve after one of its parts has been turned inside out; and Figure 6 is a sectional view of a portion of the playball showing the extended valve ready for inflation.

The valve may be made in a closed mold by conventional molding techniques or the valve can be a pieced construction, but I prefer to form the valve by the dipping technique and for this purpose provide a mold 10 which is shaped like the hilt portion of a dagger carrying a circular guard. The mold 10 is first coated with an appropriate coagulant and then is immersed in rubber latex up to the section line 4—4 of Figure 3. After a time, the mold is coated with a deposit of rubber 11 which is dried, vulcanized and then stripped from the mold. The deposit shown in section in Figure 3 comprises an inflating tube 12 and a hollow torus 13, the wall 15 of which bears an aperture 16 which should be large enough to permit the tube to pass through it.

In preparation for assembly, the tube 12 is turned inside out and pushed through the aperture 16 in the wall 15, or the torus is turned back so that the tube 12 projects through the aperture 16 of the torus wall, as shown in Figure 5. Both procedures produce an operative valve but turning the tube inside out is the preferred practice. In this case there is no danger that the sealing wall 15 and that the margins of the aperture 16 will be stretched or deformed in the turning operation. The closed end 17 of the tube is then cut off and the valve is attached to a playball or a bladder 18, as shown in Figure 6. The torus wall 14 forms the attachment flange for the valve. Attachment may be made by means of cement or by a layer of adhesive rubber (tie-gum) which is subsequently vulcanized. The bladder 18 is inflated by blowing through the tube.

When the inflation is complete, the tube is pinched between the thumb and forefinger and folded. The folded tube is then tucked through the aperture and under the upper wall of the torus, as shown by the folded parts extending to the right in Figure 1. The free end of the tube is then tucked through the same aperture in the opposite direction, as shown by the parts extending to the left in Figure 1.

In Figure 5 it will be noticed that when either the tube or the torus is turned inside out, the walls 14 and 15 lie in approximately parallel planes. The inflation of the bladder stretches the walls 14 and 15 over a curved, and in the case of playballs, over a spherical surface. The result is that pressure within the bladder urges the wall 15 into contact with the wall 14 and squeezes the sides of the torus walls tightly together. In this manner, the stress of inflation is used to hold the valve tightly closed.

As will be seen from Figures 5 and 6, in the completed valve, one end of tube 12 is expanded radially outward from the tube to form the annular attaching flange 14, and this flange is continued from its outer periphery radially inwardly towards the tube to form the annular wall 15, the inner edge of which closely surrounds the tube 12.

It is obvious that the apertured sealing portion of the torus could be made as a separate piece and be separately cemented around its rim to the flange 14 or to the bladder 18. I prefer the one piece construction because of the simplicity and cheapness of its manufacture. These valves are surprisingly easy to manipulate and are very dependable. They successfully hold the air in the bladder for long periods of time.

I claim:

1. An inflation valve for attachment to the exterior surface of playballs and the like and formed of resilient flexible material, said valve comprising a toroidal hollow base having connected top and bottom walls, a tube of less cross section than the base connected to the bottom wall and opening therethrough at one end, an aperture in the top wall, said tube extending through said aperture and outwardly from the top wall of the base to provide an inflating member, said bottom wall forming an attaching portion for the article to be inflated and said tube, by reason of opening through said bottom wall, providing direct communication for the inflating medium with the article to be inflated.

2. A playball and the like having an inflation valve of resilient flexible material comprising a toroidal hollow base having connected top and bottom walls, a tube of less cross section than the base connected to the bottom wall and opening therethrough at one end, an aperture in the top wall, said tube extending through said aperture and outwardly from the top wall of the base to provide an inflating member, said bottom wall being attached throughout a substantial portion of its area to an article to be inflated and said tube, by reason of opening through said bottom wall, providing direct communication for the inflating medium with the article, inflation of the article causing the top and bottom walls of the said toroidal hollow base to be drawn together with the top wall substantially following the contour of the bottom wall and tensioned with respect thereto.

GORDON E. GOTT.

REFERENCES CITED

The following references are of record in the file of this patent:

UNITED STATES PATENTS

| Number | Name | Date |
|---|---|---|
| 1,909,921 | Tompkins | May 16, 1933 |
| 1,913,454 | Predmore | June 13, 1933 |